United States Patent [19]
Tajika

[11] Patent Number: 4,811,367
[45] Date of Patent: Mar. 7, 1989

[54] CIRCUIT FOR DETECTING PLURAL KINDS OF MULTI-FRAME SYNCHRONIZATION ON A DIGITAL TRANSMISSION LINE

[75] Inventor: Nobuji Tajika, Kawasaki, Japan

[73] Assignee: Fujitsu Limited, Kawasaki, Japan

[21] Appl. No.: 108,111

[22] Filed: Oct. 14, 1987

[30] Foreign Application Priority Data

Oct. 17, 1986 [JP] Japan ................. 61-248012

[51] Int. Cl.⁴ .............................. H04L 7/00
[52] U.S. Cl. .................... 375/116; 375/108; 370/105; 370/108
[58] Field of Search ............... 375/108, 106, 110, 116; 370/105, 108

[56] References Cited

U.S. PATENT DOCUMENTS

| | | | |
|---|---|---|---|
| 4,404,675 | 9/1983 | Karcheuski | 375/116 X |
| 4,493,093 | 1/1985 | Veillard | 375/110 |
| 4,524,445 | 6/1985 | Fujii | 375/110 X |

Primary Examiner—A. D. Pellinen
Assistant Examiner—Derek S. Jennings
Attorney, Agent, or Firm—Staas & Halsey

[57] ABSTRACT

A system detects/recognizes multi-frame synchronization bits of concurrently existing plural unknown kinds of multi-frame synchronization in received signals of digital transmission. The above-mentioned detection as well as recognition is carried out by software in place of the wired logic of prior art. A micro processor instructs a gate to extract a specific bit out of received sequential bits. The extracted bit is input to a shift register and output therefrom after being delayed by the elapsing frame numbers via respective output terminals corresponding to the delaying frame numbers. The output bit is compared with non-delayed input bit, and if they meet a predetermined format, the bit is recognized as multi-frame synchronization. The bit extraction is scanned over all the control signal bits, and the results are stored in a memory. By use of thus stored information, the processor recognizes the existing types of multi-frame synchronization. Furthermore, based on thus stored information, the processor periodically monitors whether the synchronization is normal, and if it is stepping out, the synchronization detection procedure is repeated. Simplified circuits enable the flexible system to recognize mixed kinds of multi-frame synchronization. The benefit of eliminating hard-wired logic is obtained by programming of the micro processor.

4 Claims, 7 Drawing Sheets

PRINCIPLE CONFIGURATION
OF THE INVENTION

TYPICAL STRUCTURE OF SIGNALS OF
MULTI-FRAME SYNCHRONIZATION

FIG. 2
(PRIOR ART)
TYPICAL LAYOUT OF CONTROL SIGNALS OF 8-FRAME SYNCHRONIZATION

|     | b3  | b4  | b5  | b6  | b7  |
| --- | --- | --- | --- | --- | --- |
| F1  | MF  | S27 | –   | MFn | S30 |
| F2  | S1  | –   | MFn | S4  | –   |
| F3  | S6  | MF  | S3  | S9  | MF  |
| F4  | S11 | S2  | S8  | S14 | S5  |
| F5  | S16 | S7  | S13 | S19 | S10 |
| F6  | S21 | S12 | S18 | S24 | S15 |
| F7  | S26 | S17 | S23 | S29 | S20 |
| F8  | –   | S22 | S28 | –   | S25 |
| F9  | MFn | S27 | –   | MF  | S30 |
| F10 | S1  | –   | MF  | S4  | –   |

FIG. 3
(PRIOR ART)
TYPICAL LAYOUT OF CONTROL SIGNALS OF 16-FRAME SYNCHRONIZATION

|     | b3  | b4  | b5  | b6  | b7  |
| --- | --- | --- | --- | --- | --- |
| F1  | MF  | S57 | –   | MFn | –   |
| F2  | S1  | –   | MFn | S4  | –   |
| F3  | S6  | –   | S3  | S9  | MF  |
| F4  | S11 | –   | S8  | S14 | S5  |
| F5  | S16 | MF  | S13 | S19 | S10 |
| F6  | S21 | S2  | S18 | S24 | S15 |
| F7  | S26 | S7  | S23 | S29 | S20 |
| F8  | S31 | S12 | S28 | S34 | S25 |
| F9  | S36 | S17 | S33 | S39 | S30 |
| F10 | S41 | S22 | S38 | S44 | S35 |
| F11 | S46 | S27 | S43 | S49 | S40 |
| F12 | S51 | S32 | S48 | S54 | S45 |
| F13 | S56 | S37 | S53 | S59 | S50 |
| F14 | –   | S42 | S58 | –   | S55 |
| F15 | –   | S47 | –   | –   | S60 |
| F16 | –   | S52 | –   | –   | –   |
| F17 | MFn | S57 | –   | MF  | –   |
| F18 | S1  | –   | MF  | S4  | –   |

PRIOR ART CIRCUIT

FIG. 8

```
( TAKING-IN CONTROL SIGNALS )
            │
┌───────────────────────────────────────────┐
│ TAKE-IN THE SIGNAL INFORMATION:           │
│   S1~S30 OF THE BIT b3~b7 OF TS0 AND      │
│   S1~S60 OF THE BIT b3~b7 OF TS2          │
│ ACCORDING TO THE TIMING BITS STORED IN THE│
│ M-F TIMING MEMORY, VIA SHIFT REGISTER 24 AND│
│ CONTROL SIGNAL REGISTER 30.               │
└───────────────────────────────────────────┘
            │
┌───────────────────────────────────────────┐
│ OUTPUT THE STORED INFORMATION VIA REGISTER│
│ 36, IF REQUIRED FROM UPPER PROCESSING DEVICE.│
└───────────────────────────────────────────┘
            │
┌───────────────────────────────────────────┐
│ END & GO TO MONITORING STEPPING-OUT OF SYNCH.│
└───────────────────────────────────────────┘

( MONITORING STEPPING-OUT OF M-F SYNCHRONIZATION )
            │
┌───────────────────────────────────────────┐
│ DETECT STEPPING-OUT OF M-F SYNCH. ACCORDING│
│ TO THE TIMING INFORMATION STORED IN       │
│ M-F SYNCHRONIZATION MEMORY, AND STORE ITS │
│ TS NO. AND THE BIT, AT WHICH THE STEPPING-│
│ OUT TOOK PLACE, IN MEMORY.                │
└───────────────────────────────────────────┘
            │ N
            ▶◀
┌───────────────────────────────────────────┐
│ ACCORDING TO THE STEPPING-OUT INFORMATION,│
│ PERIODICALLY MONITOR THE M-F SYNCHRONIZATION│
│ TO CHECK IF THE M-F RECOVERED?            │
└───────────────────────────────────────────┘
            │
      < IS THE M-F SYNCHRONIZATION >──N
      <   RECOVERED NORMAL?        >
            │ Y
      ┌───────────────────────────────┐
      │ DELETE THE STEPPING-OUT INFORMATION│
      │ FROM THE MEMORY.              │
      └───────────────────────────────┘
            │
      < IF THERE IS ANOTHER STEPPING-OUT OF M-F >
      < SYNCHRONIZATION, CONTINUE THE MONITORING.>
            │
          [END]
```

CIRCUIT FOR DETECTING PLURAL KINDS OF MULTI-FRAME SYNCHRONIZATION ON A DIGITAL TRANSMISSION LINE

BACKGROUND OF THE INVENTION

1. Field of the Invention

This invention relates to a circuit for detecting-/recognizing synchronization pulses of plural formats of multi-frame synchronization on a time-division digital transmission line.

2. Description of the Related Art

As widely known, bit format of a digital transmission is based on a protocol i.e. an agreement. Referring to FIG. 1, a typical format of synchronization bits of a multi-frame synchronization is hereinafter described, to which the present invention is applicable. In the figure, F1 through F20 . . . respectively indicate frame numbers. The period of a single frame is 125 micro second for this case where the sampling frequency is 8 kHz. Each frame consists of as many as n+1 time-slots, TS0 through TSn. The number n+1 is typically 32 for 2.048 Mb/s bit rate, and 128 for 8.048 Mb/s. However, this explanation shall be made for the case where n+1 is 32. Two time-slots, TS0 and TS2, are used for control signals, such as including an enviromental information, alarm signal, etc. or vacant. The balance thirty time-slots are used for voice channels, thus, thirty voice channels plus two control channels, each sampled by 8 kHz, are muliplexed by time division. Each time-slot consists of 8 bits. The first bit of each frame, i.e. the 0-th bit of the first time slot TS0, is for the frame synchronization, recognition of which is carried out by violation of the MD (modified dipulse) code. The technique of this single-frame synchronization and its recognition method have been well known and widely used. Five bits, i.e. the third through 7th bit, of the eight bits of each of the time slots, TS0 and TS2, are further used for above-mentioned control signals, in which the synchronization bits for multi-frame synchronization are included.

A typical layout of the control signals S1 through S30 and the multi-frame synchronization bits, MF and MFn, in a sequential order of the frames are shown in FIG. 2. The multi-frame synchronization bit MF in the figure means "1", as well as MFn means "0". Location of the MF bit in each bit column, b3 through b7, of FIG. 2 is independent from that of each other bit column. However, in a bit column, the MF bit and MFn bit are alternately arranged for every 8-frame sequence, which is of the format promised in advance for the 8-frame synchronization, thus the multi-frame synchronization bits are distinguished from the other signal bits. The number "eight", for example for this case, shall be hereinafter called as a multiplicity number of the multi-frame synchronization.

In FIG. 3, there is shown a typical layout of the control signals S1 through S60 as well as the multi-frame synchronization bits, MF and MFn, and vacants in the same five bits, i.e. the third through 7th bits, for a sequence of the frames of the 16-frame synchronization, where the MF and MFn are alternately arranged for every 16-frame sequence in each bit column. A 20-frame synchronization is also generally used. This frame synchronization having a large multiplicity number, such as 8, 16 or 20, is used for a case where a control signal requiring many bits, such as of a slowly changing information, is transmitted by the bits between the multi-frame synchronize bits MF and MFn, because of its longer cycle time availability. In these figures, the mark "—" indicates vacancy or a spare. The format shown in FIG. 2 is also reported in detail in the magazine "Shisetsu" vol. 34, No. 4, p 75 by NTT (Nippon Telephone & Telegram), in which a digital switching system Model D70 is disclosed. In a practical application field, there is a chance that the local systems each of which having different multiplicity number, such as 8, 16 or 20 as mentioned above, of multi-frame synchronization must be combined into a bigger transmission line. Thus, there can be a digital transmission system in which different kinds, i.e. different multiplicity numbers, of multi-frame synchronization, in other words different numbers of frames for which the synchronization bit, MF or MFn, appears alternately, must be concurrently existing. For example, if an 8-frame synchronization system and a 16-frame synchronization system are combined, the time-slot TS0 is formatted for 8-frame synchronization by the layout of FIG. 2, while the time-slot TS2 is formatted for the 16-frame synchronization by the layout of FIG. 3, as both shown also in FIG. 1. Therefore, a receiving terminal of the system must be ready to detect what type of, i.e. how many multiplicity numbers of, synchronization is involved therein.

A prior art circuit for detecting the multi-frame synchronization bits and its multiplicity number is schematically shown in FIG. 4. In the figure, the transmission line 1 delivers voice signals as well as control signals and multi-frame synchronization bits of the frame format shown in FIG. 2 and 3. For every frame cycle, a timing circuit 4-1 enables the gate 2-1 only during a specific, predetermined, period in which a specific bit is to come in. Thus, only the specific bit of each frame received from the transmission line 1 is outputted by the gate 2-1 to a shift register 6-1 as well as to an exclusive OR gate 8-1. The bit from the gate 2-1 is delayed by the shift register 6-1 by eight frames and outputted from its output terminal Q8, and delivered to the exclusive OR gate 8-1. The exclusive OR gate 8-1 outputs an output signal "1" on terminal 10-1 when the bit directly from the gate 2-1 and the 8-frame-delayed bit from the shift register 6-1 are of different logic value. Therefore, when the output signal "1" on terminal 10-1 is stably outputted on every eight frame-cycle for several times, it means that the bit specified by the timing circuit 4-1 is the multi-frame synchronization bits MF /MFn of an eight- (i.e. multiple-) frame synchronization. In the same way, timing circuits 4-2~4-5, gates 2-2~2-5, shift registers 6-2~6-5, and exclusive OR gates 8-2~8-5 are provided, except that the bits specified by the timing circuits are respectively different, each corresponding to the bit b4 through b7. Thus, all the five bits of the b3 through b7 of the time slot TS0 are respectively detected to recognize that the received signals are of 8-frame synchronization.

Then, a second circuit group composed of timing circuits 5-1~5-5, gates 3-1~3-5, shift registers 7-1~7-5, and exclusive OR gates 9-1~9-5 is further provided, in the same way as described above, excepting that each timing circuit 5-1 through 5-5 selectively enables each corresponding gate 3-1 through 3-5 at a specific, i.e. predetermined, timing to pass the specific bits, b3 through b7, of the time slot TS2 of each frame. Each shift register 7-1 through 7-5 delays the inputted signal by 16 frames. Therefore, when each of the output signals "1" on terminals 11-1 through 11-5 is stably outputted from respective exclusive OR gates 9-1 through 9-5 on every 16 frame-cycle, it is recognized that the bits specified by the timing circuits 5-1 through 5-5 are the multi-frame synchronization bits MF /MFn of the 16-frame synchronization, as shown in FIG. 3. Thus, it is recognized that there are concurrently existing two kinds of multi-frame synchronization in the received signals.

Summarizing the prior arts for recognizing the multi-frame synchronization bits, the recognition is carried out by the circuit groups, each provided particularly for individual multi-frame synchronization, i.e. so-called wired logic. Therefore, the required number of the circuit groups is increased proportionally to the number of, i.e. how many kinds of, the multi-frame synchronization involved therein are to be detected. This fact increases the cost of the hardware, and reduces the flexibility at the installation or the field service of the hardware.

SUMMARY OF THE INVENTION

It is a general object of the present invention, therefore, to provide a simple as well as flexible circuit configuration which can detect the plural multiplicity numbers of multi-frame synchronization.

A detection circuit of multi-frame synchronization of a digital transmission line according to the present invention includes: bit extraction circuit for extracting a specific bit of each frame on the transmission line; delay circuit for delaying the extracted specific bit by a specific multiplicity number of the frames; detection circuit for detecting a bit of the multi-frame synchronization out of the bits extracted by the bit extraction circuit and the bits delayed by the delay circuit; timing control circuit for controlling a timing on which the bit extraction circuit extracts the specific bit as well as controlling the specific multiplicity number by which the delay circuit delays the specific bit; and a memory device for storing information of timings on which the bit extraction circuit extracts the multi-frame synchronization bits as well as information of timings and the multiplicity number which the timing control circuit specifies to the bit extraction circuit as well as to the delay circuit.

With these circuits, unknown multi-frame synchronization bits are detected, then unknown multiplicity numbers of the multi-frame synchronization in the received signals are recognized, without requiring installation of complex logic circuits but with only a micro processor and its programs. The flexibility thus effected by the programming is much appreciated particularly in a field application.

The above-mentioned features and advantages of the present invention, together with other objects and advantages, which will become apparent and will be more fully described hereinafter with reference being had to the accompanying drawings forming a part hereof, wherein like numerals refer to like parts throughout.

BRIEF DESCRIPTION OF THE DRAWINGS

FIG. 2 shows a typical layout of control signals in frames of a 8-frame synchronization.

FIG. 3 shows a typical layout of control signals in frames of a 16-frame synchronization.

FIG. 8 shows a flow chart illustrating procedures for detecting a stepping-out of the multi-frame synchronization.

DESCRIPTION OF THE PREFERRED EMBODIMENTS

Figure 1:
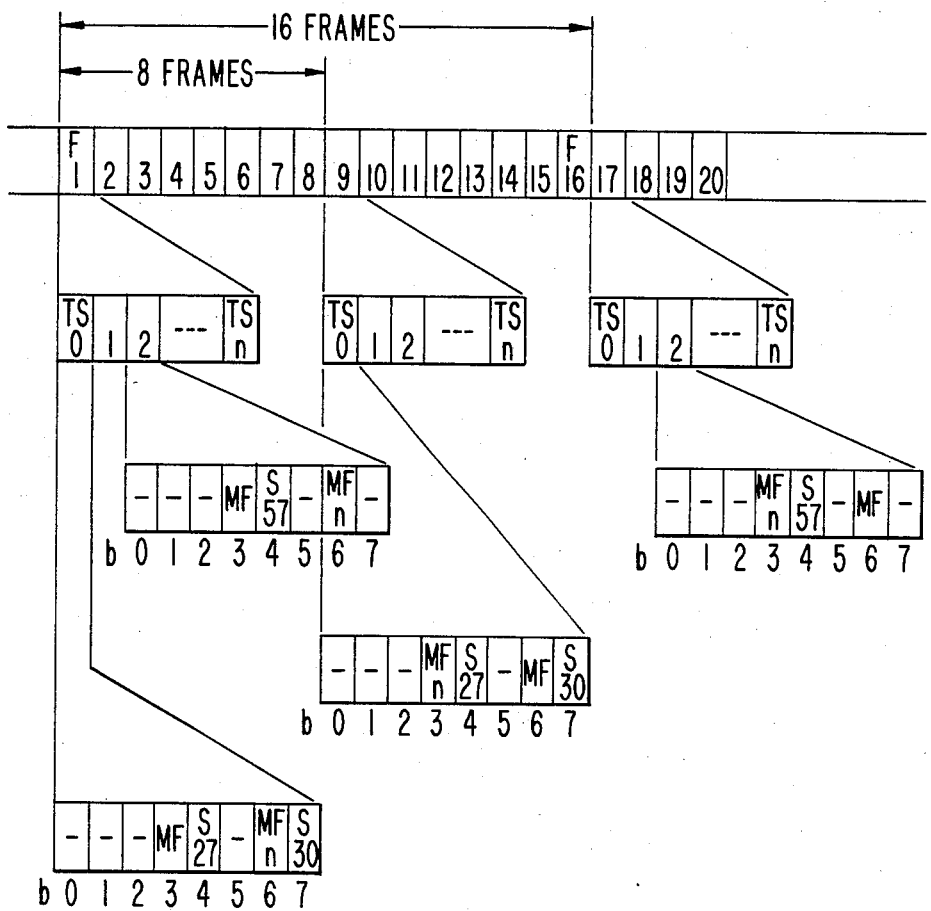
FIG. 1 shows a typical frame structures of signals of of a multi-frame synchronization.
Figure 4:
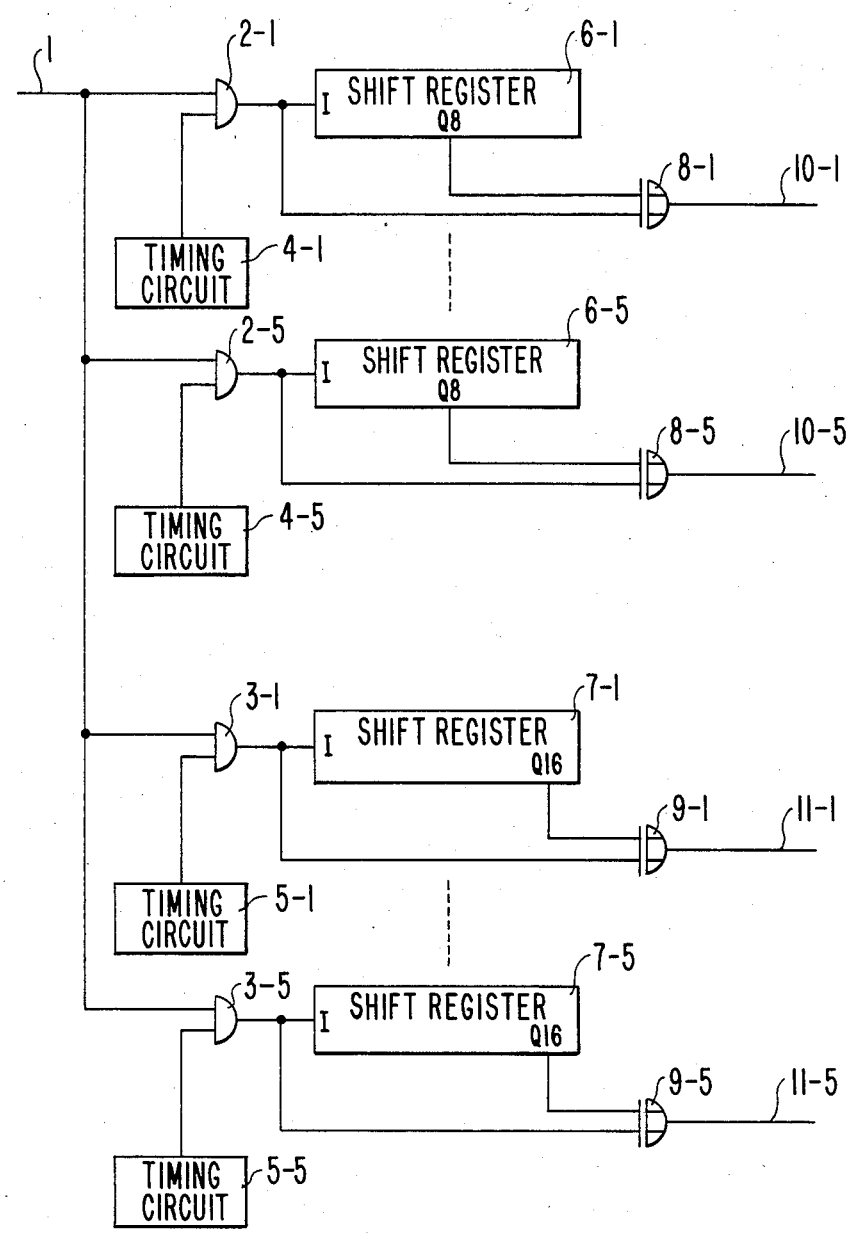
FIG. 4 shows prior art circuits for detecting bits for 8 and 16 frame synchronization.
Figure 5:
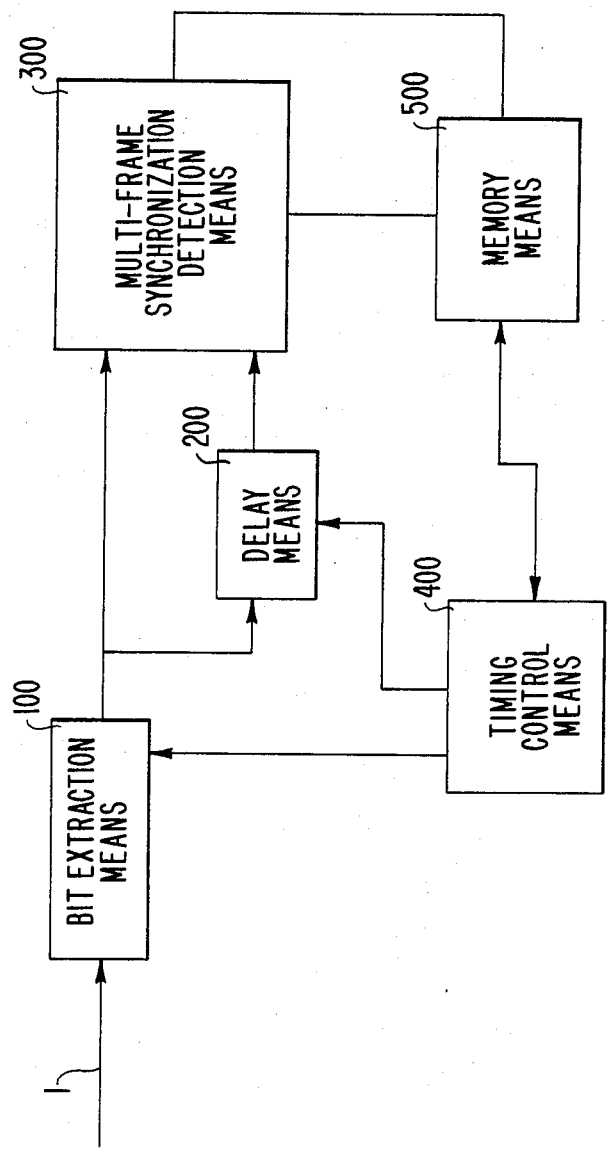
FIG. 5 shows a block diagram schematically illustrating the principle configuration of the present invention.

Referring to FIG. 5, the principle of the present invention is explained. The numeral 1 denotes a transmission line from which a sequence of digital signals are received to be detected of the multi-frame synchronization. The numeral 100 denotes bit extraction means which extracts a specific bit from each frame on the transmission line. The numeral 200 denotes delay means which delays the above-mentioned extracted specific bit by specific multiplicity numbers of the multi-frame synchronization. The numeral 300 denotes detection means which detects a bit of the multi-frame synchronization out of the above-mentioned bits extracted by the bit extraction means 100 and the bits delayed by the delay means 200. The numeral 400 denotes timing control means which controls a timing on which the bit extraction means 100 extracts the specific bit as well as controls the frame number by which the delay means 200 delays the specific bit inputted thereto. The numeral 500 denotes memory means which stores information of timings on which the bit extraction means 100 detects the multi-frame synchronization bits as well as information of timings and the multiplicity number which the timing control means 400 specifies to the bit extraction means 100 as well as to the delay means 200 respectively.

Figure 6:
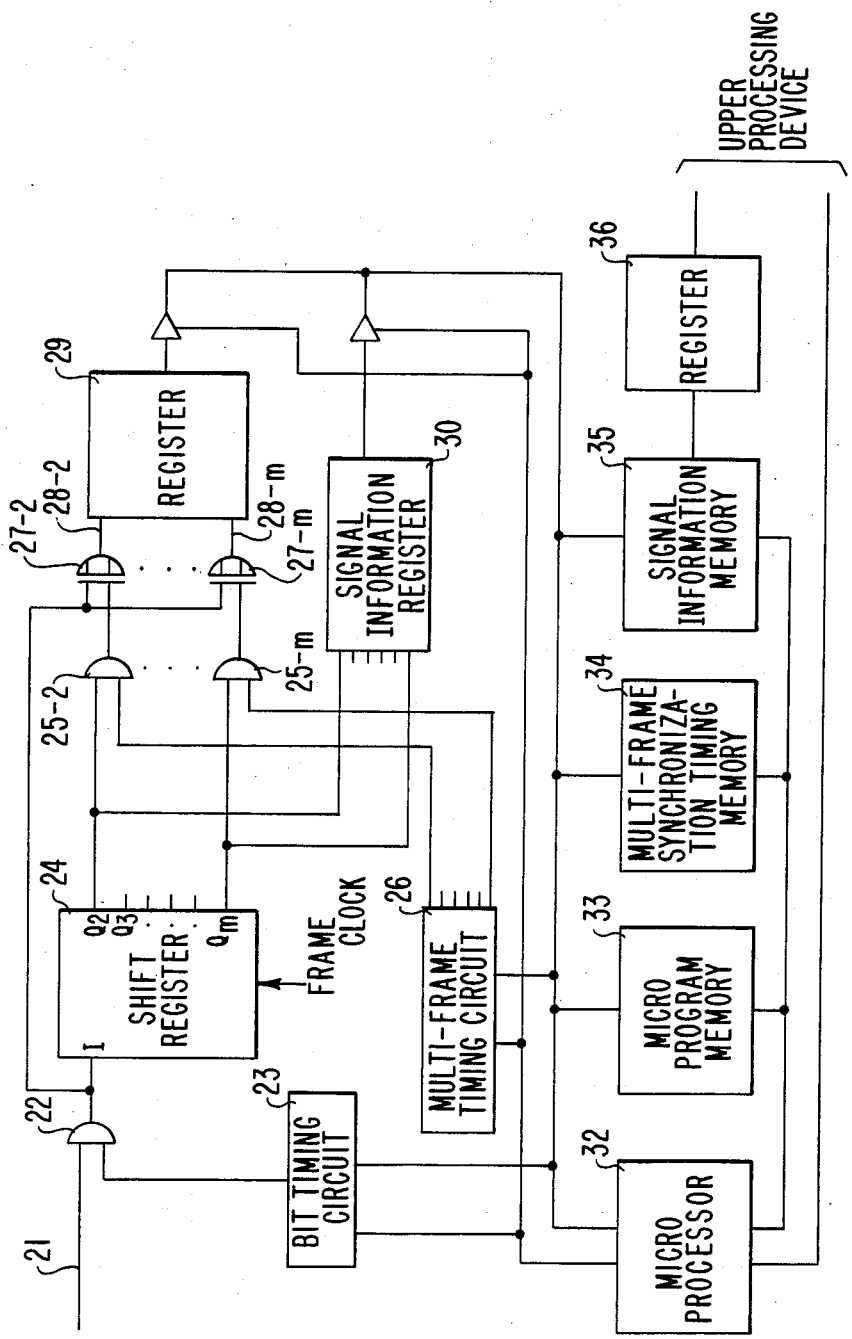
FIG. 6 shows a block diagram schematically illustrating the practical configuration of the present invention.

In FIG. 6, practical circuits of the embodiment of the present invention are schematically shown, where output terminals $Q_2$ through $Q_m$ of the shift register 24, the corresponding gates 25-3 through 25-(m minus 1), exclusive OR gates 27-3 through 27-(m minus 1), and input terminals 28-3 through 28-(m minus 1) to the register 29 are not shown in order to simplify the drawings. The numeral 21 corresponds to the transmission line 1. An AND gate 22 composes the bit extraction means 100. The shift register 24 and AND gates 25-2 through 25-m compose the delay means 200. Exclusive OR gates 27-2 through 27-m and a register 29 compose the detection means 300. A bit timing circuit 23, a multi-frame timing circuit 26 and a micro processor 32 compose the timing control means 400. A multi-frame timing memory 34 composes the memory means 500. A signal information register 30 and a signal information memory 35 are the means to deliver a signal indicating that the multi-frame synchronization is detected, to an upper processing device, such as a signaling processor. A microprogram memory 33 is means for storing microprograms which control operations of the micro processor 32.

Figure 7:
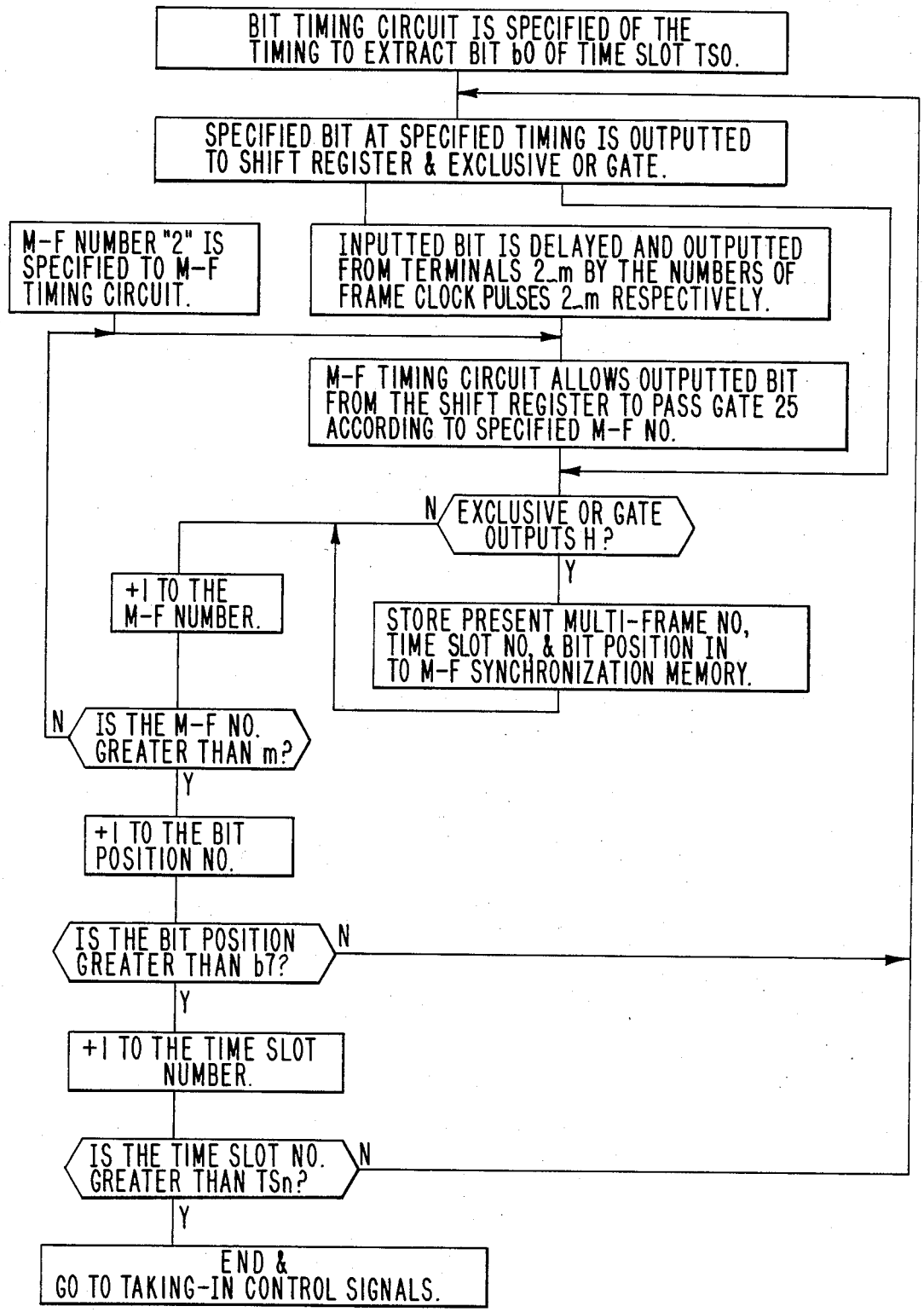
FIG. 7 shows a flow chart illustrating procedures for detecting the multi-frame synchronization bits and recognizing a multiplicity number of the multi-frame synchronization.

Operation of the circuit is hereinafter explained, referring to flow charts in FIG. 7 and 8. In the flow charts, "multi-frame synchronization" is abbreviated as "M-F" and/or "synch." For the circuits of FIG. 6 to recognize a multi-frame synchronization, at first the micro processor 32 instructs the bit timing circuit 23 to extract the bit b0 of the time slot TS0 of each frame F of the signals received from the transmission line 21. According to the instructed timing from the micro processor 32, the bit timing circuit 23 delivers to the gate 22 a pass signal, only during which the gate 22 becomes conductive to pass the inputted signal bit thereto. Thus only the bit b0 of the time slot TS0 is extracted by the gate 22 out of each frame F of the received signals, and delivered to the shift register 24 as well as to the exclusive OR gates 27-2~27-m. The b0 bit signal inputted into the input terminal I of the shift register 24 is shifted upon an application of a clock pulse of each single frame cycle, and outputted from output terminal Q2~Qm respectively, in the manner that the bit delayed by m frames is outputted from the output terminal Qm. At first, the micro processor 32 instructs a multiplicity number "2", for this case, of the multi-frame synchronization to the multi-frame timing circuit 26. The multi-frame timing circuit 26, corresponding to the multiplicity number "2" received from the micro processor 32, outputs a pass signal, i.e. an enabling signal, only to the gate 25-2. Thus, the bit b0 of the time slot TS0, which has been delayed by two frame cycles and outputted from the output terminal Q2, is inputted to the exclusive OR gate 27-2. Onto another input terminal of the exclusive OR gate 27-2 the bit b0 of the time slot TS0 is also inputted without any delay from the gate 22. If this inputted bit without delay is of the multi-frame synchronization, its logic level must be opposite to the delayed bit simultaneously applied to the exclusive OR gate 27-2, according to the predetermined protocol. The exclusive OR gate outputs a level "1" (i.e. H) only when the two input signals are of opposite level to each other. Therefore, when there are no 2-frame synchronization bits, MF and MFn alternately, in the position of b0 of the time slot TS0, the exclusive OR gate 27-2 does not output a detection signal having level "1" on 28-2. It takes at least about—frame cycles to confirm the multi-frame synchronization by watching the output on 28-2 of the exclusive OR gate. Then, because it is confirmed that there is no 2-frame synchronization, the processor 32 instructs a multiplicity number "3" to the multi-frame timing circuit 26. The multi-frame timing circuit 26, corresponding to the multiplicity number "3" from the micro processor 32, outputs a pass signal only to the gate 25-3, which is thus enabled. Thus, the bit b0 of the time slot TS0, which has been delayed by two frame cycles and outputted from the output terminal Q2, is inputted to the exclusive OR gate 27-3. Onto another input terminal of the exclusive OR gate 27-3 there is also inputted from the gate 22 a bit presently existing at the bit position b0 of the time slot TS0, in other words, without being delayed at all. Therefore, then, if there is not a 3-frame synchronization bit in the position of b0 of the time slot TS0, the exclusive OR gate 27-3 does not output the detection signal having a level H on 28-3. After confirming the output signal 28- that there is no 3-frame synchronization, the micro processor 32 instructs a multiplicity number "4" in the similar way as those for the multiplicity number "2" or "3". This procedure is repeated by increasing the multiplicity number until the number reaches a predetermined number m, for example twenty. If this checked bit position is really b0 of the time slot TS0, there should be detected no multi-frame synchronization bit, because this bit is used for single-frame synchronization (not multi-frame synchronization).

After confirming no multi-frame synchronization bit existing in this bit position b0, the micro processor 32 instructs the bit timing circuit 23 to extract the next bit b1 of the same time slot TS0, and instructs multiplicity number "2" up to the predetermined maximum multiplicity number "m" sequentially to the multi-frame timing circuit 26, in the same way as those for the bit b0. Thus, each bit position in the time slot TS0 is checked whether there are existing multi-frame synchronization bits MF and MFn. Further more, each bit position of the remaining time slots, TS1 through TSn, i.e. up to the last bit b7 of the last time slot TSn, are checked to observe whether the multi-frame synchronization bits are existing therein.

As the result of the above-described procedures, it is found, for example in FIG. 2, that the synchronization bits, MF and MFn, of 8-frame synchronization are existing in each bit position b3 through b7 of the time slot TS0, and in FIG. 3, that the synchronization bits, MF and MFn, of 16-frame synchronization are existing in each bit position b3 through b7 of the time slot TS2. The time slot and the bit position in which the multi-frame synchronization bits are detected, the multiplicity number of the recognized multi-frame synchronization, and their timing, etc, are stored in the multi-frame synchronization timing memory 34 by the micro processor 32. Further more, the micro processor 32 monitors the status of the multi-frame synchronization, i.e. the micro processor instructs both the timing circuits 23 and 26 according to the timing information stored in the multi-frame synchronization timing memory 34 to pass the multi-frame synchronization bits and observes the output of the exclusive OR gate, for predetermined frame cycles, for example as many as two or three. When no stepping-out of the synchronization is confirmed by this monitoring procedure, the full procedure of recognizing the multi-frame synchronization is completed.

As for processing the control signals S1 through S30 in the bit positions b3 through b7 of the time slot TS0 as well as the control signals S1 through S60 in the bit positions b3 through b7 of the time slot TS2, the processor 32 instructs the bit timing circuit 23 a timing based on the timing information for the multi-frame synchronization stored in the multi-frame synchronization timing memory 34. In response, the gate 22 passes all of these signal bits through the shift resister 24 and the signal information register 30 to the signal information memory 35, thus these control signals are stored therein. When an instruction is received from an upper device, such as a signaling processor, which is not shown in the figure, to read out the information, the stored information in the signal information memory 35 are outputted through a register 36.

A procedure to detect a stepping-out of the frame synchronization bits during the detection by the multi-frame synchronization detector circuit is shown in FIG. 8. When the multi-frame synchronization detection circuit detects a stepping-out of the multi-frame synchronization, the time-slot number and the bit at which the stepping-out took place are stored as a stepping-out information in the memory. According to thus stored stepping-out information, the multi-frame synchronization detection circuit periodically monitors the multi-frame synchronization and checks if it has recovered to normal or not. If it has recovered, the stepping-out information is deleted from the memory. If there still is another stepping-out of the multi-frame synchronization, the monitoring is continued on.

Summarizing the system and the procedures for recognizing the multiplicity of the multi-frame synchronization by the present invention, the recognition is carried out by the software, i.e. the stored program, of the micro processor instead of the fully wired logic of the prior art. Therefore, the circuits can be simplified, for example a single shift register 24 replaces the plurality of the shift registers, which are required as many as (number of the bits to be checked in a time slot) x (number of the kinds of the multi-frame synchronization). Further more, the number of the kinds of the multi-frame synchronization to be recognized is not limited by the hardware, but can be arbitrarily chosen by the software, i.e. programming the micro processor.

Therefore, the system employing the present invention is applicable to any kinds of, i.e. any multiplicity number of, multi-frame synchronization. This flexibility is appreciated very much in the field use, where the kind of the multi-frame synchronization is not known beforehand and plural kinds of the multi-frame synchronization are received. This feature also allows the equipment to be used as a measuring instrument. The much decreased cost as well as much reduced size, of the ICs of the micro processor and its memory, is also in favor of embodying the present invention.

The many features and advantages of the invention are apparent from the detailed specification and thus, it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim is:

1. A detection circuit of multi-frame synchronization of signals received from a digital transmission line, comprising:

bit extraction means for extracting a specific bit of each frame on the transmission line;

delay means for delaying said extracted specific bit by a specific multiplicity number of said frames;

detection means for detecting a bit of the multi-frame synchronization out of said bits extracted by said bit extraction means and said bits delayed by said delay means;

timing control means for controlling a timing on which said bit extraction means extracts said specific bit as well as said specific multiplicity frame number by which said delay means delays said extracted bit; and memory means for storing information of timings on which said bit extraction means extracts said multi-frame synchronization bits as well as information of timings and said multi-frame number both of which said timing control means specifies to said bit extraction means and said delay means, whereby unknown synchronization bits as well as unknown multiplicity number of frames of the multi-frame synchronization in the received signals is detected.

2. A detection circuit of multi-frame synchronization according to claim 1, wherein said timing control means includes a micro processor.

3. A detection circuit of multi-frame synchronization according to claim 1, wherein said delay means is composed of a shift register which is shifted by a clock pulse whose cycle time is that of frames of the digital transmission line.

4. A detection circuit of multi-frame synchronization according to claim 1, wherein said detection means periodically compares a status of said multi-frame synchronization bits with previously detected and stored information corresponding to a stepping-out of the multi-frame synchronization, whereby said detection circuit of multi-frame synchronization is controlled to be in synchronization with the received signals.

* * * * *